(12) United States Patent
Rasmussen

(10) Patent No.: US 7,001,547 B2
(45) Date of Patent: Feb. 21, 2006

(54) METHOD AND APPARATUS FOR JOINING SHEET- OR RIBBON FORMED FLOWS IN A COEXTRUSION PROCESS

(76) Inventor: Ole-Bendt Rasmussen, Sagenstrasse 12, CH-6318, Walchwil/Zug (CH)

( * ) Notice: Subject to any disclaimer, the term of this patent is extended or adjusted under 35 U.S.C. 154(b) by 360 days.

(21) Appl. No.: 10/257,144

(22) PCT Filed: Apr. 11, 2001

(86) PCT No.: PCT/EP01/04885

§ 371 (c)(1),
(2), (4) Date: Oct. 9, 2002

(87) PCT Pub. No.: WO01/78966

PCT Pub. Date: Oct. 25, 2001

(65) Prior Publication Data

US 2003/0090026 A1  May 15, 2003

(30) Foreign Application Priority Data

| Apr. 13, 2000 | (EP) | ...................... PCT/EP00/03713 |
| Apr. 13, 2000 | (GB) | .................................. 0009090 |
| Dec. 22, 2000 | (GB) | .................................. 0031720 |

(51) Int. Cl.
*B29C 47/92* (2006.01)
*B29C 47/06* (2006.01)
(52) U.S. Cl. .................. 264/40.7; 264/70; 264/173.16; 264/173.19; 264/177.16; 425/131.1; 425/133.1; 425/132; 425/462
(58) Field of Classification Search ........... 264/173.11, 264/173.14, 40.7, 70, 177.16, 173.16, 173.19; 425/133.1, 132, 462, 380, 381, 131.1
See application file for complete search history.

(56) References Cited

U.S. PATENT DOCUMENTS

| 3,761,211 A | * | 9/1973 | Parkinson ................. 425/133.5 |
| 4,039,364 A | * | 8/1977 | Rasmussen ................. 156/164 |
| 4,152,387 A | * | 5/1979 | Cloeren .................. 264/173.13 |
| 4,197,069 A | * | 4/1980 | Cloeren ................... 425/131.1 |
| 4,368,017 A | * | 1/1983 | Rasmussen .............. 425/131.1 |
| 4,469,475 A | * | 9/1984 | Krysiak ...................... 425/132 |
| 4,533,308 A | * | 8/1985 | Cloeren ................... 425/131.1 |
| 5,062,782 A | * | 11/1991 | Tompkins et al. .......... 425/113 |
| 5,108,682 A | * | 4/1992 | Tompkins et al. .......... 264/167 |
| 5,928,679 A | * | 7/1999 | Ohki et al. ................. 425/327 |
| 6,024,557 A | * | 2/2000 | Feuerherm .................. 425/532 |

\* cited by examiner

*Primary Examiner*—Mark Eashoo
(74) *Attorney, Agent, or Firm*—William J. Daniel

(57) ABSTRACT

A method and apparatus are described for coextruding two materials A and B, in which B is extruded on A through a port (3), in which the separating wall between the flows of A and B is formed as a flap closure (4) adapted to act as a non-return valve for the flow of B into A, and further means are provided for extruding B through the port in pulses. The pulses may be effected by opening and closing the closure, by mechanical transmission means or by the effect of imposing pressure difference on the flap (4) by the flows of A and/or B. The pulsing means preferably involves rams (1). The invention is particularly suitable for extruding a low viscosity material B onto a higher viscosity material A, or for making sheets or pipes with alternating segments of differential flexibility, or for coextruding a flow of solid particles with a flow of liquid.

52 Claims, 7 Drawing Sheets

Figure 1:
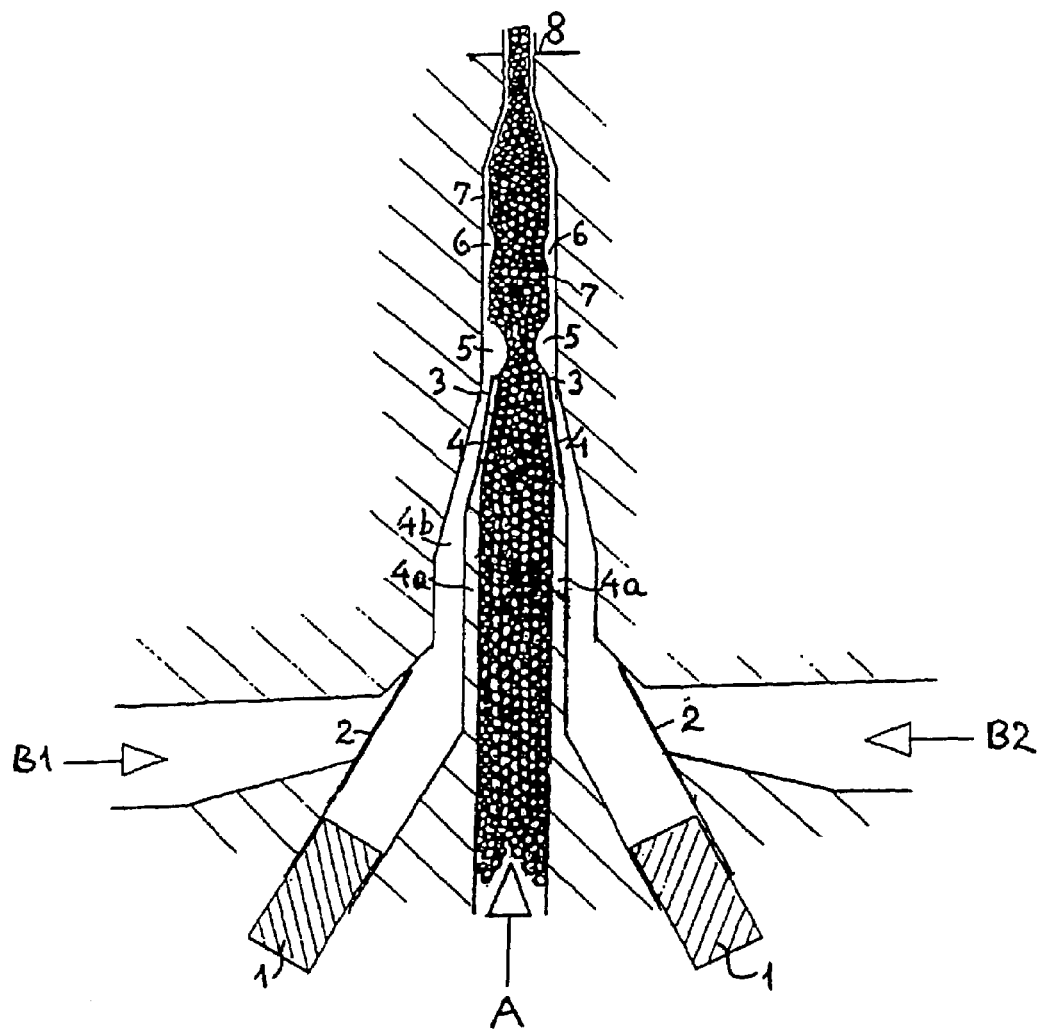

METHOD AND APPARATUS FOR JOINING SHEET- OR RIBBON FORMED FLOWS IN A COEXTRUSION PROCESS

The invention concerns a coextrusion method of the type defined in the introduction to claim 1 and the apparatus to carry out such method. It is applicable to the extrusion of generally all materials which can be extruded, such as e.g. thermoplastic polymers, inorganic pastes, for instance for forming ceramic materials, and several kinds of foodstuff.

The invention has three different aspects in connection with three different objectives. One aspect ("the first aspect") concerns the use of coextrusion for cover, on one or both sides, of an extrudable material A which during the extrusion has a high apparent viscosity, with a thin layer or thin layers of a material B having a much lower apparent viscosity. In such cases the cover will normally become very uneven or may even be missing over a part of the surface, when conventional technology is used, because the energy required to make B flow evenly distributed in a thin stream is higher than that required to make B flow in narrow thicker streams.

Another aspect of the invention ("the second aspect") concerns coextrusion of sheets or pipes in which segments of one component alternate with segments of another component, the alternation taking place along the direction of extrusion. As an important example this can be a pipe in which stiff segments alternate with flexible segments (the relative stiffness being referred to being in the product).

Still another aspect of the invention ("the third aspect") concerns coextrusion of a flow of solid generally dry particles with a flow of truly fluid material in such a way that the fluid material becomes absorbed in the flow of solid particles (that is becomes blended with the solid particles).

As an important example this can be a method of blending Teflon (polytetrafluoroethylene PTFE) particles with molten polyamide and extruding sheets, ribbons or pipes from the blend. Furthermore this aspect of the invention can be used to produce special ceramic products, especially porous products, through a process in which solid inorganic particles e.g. comprising short reinforcement fibres become blended with a prepolymer, which later is cured, or with an aqueous solution or dispersion of an inorganic material which after drying and heat treatment will act as a binder. In an analogous way, the third aspect of the invention can be used to coextrude a strand of medial material, which can be chopped up to pills.

U.S. Pat. No. 3,761,211 (Parkinson), U.S. Pat. No. 4,152,387 (Cloeren), U.S. Pat. No. 4,197,069 (Cloeren) and U.S. Pat. No. 4,533,308 (Cloeren) address the problem how to avoid or minimize what in Cloeren's patents is referred to as "the curtaining effect", i.e. a profiling of coextruded film which appears as a transverse line pattern formed where two sheet-formed flows join each other if these flows have different rheologies, and especially if they are also coextruded in about equal amounts. These four patents make use of one or more flaps, which can be pivoted and which end where the flows join each other. The first mentioned three patents have means for adjustment of the flaps, so that the ratio between the velocities of the flows where they meet, can be adapted to the rheological properties and the throughputs of the components. The last mentioned patent makes use of one or more free floating, pivoting flaps, which automatical adjust to different rheologies and throughputs of the components, namely so that the pressure becomes the same on the two sides of a flap. The "curtaining effect" which these four patents counteract is a problem different from the problem which the first aspect of the present invention addresses (see above), and which results in a longitudinal instead of transverse striation. The inventor of the present invention has found by experimentation that the precautions disclosed in the mentioned four patents do not solve the said problem.

U.S. Pat. No. 4,469,475 (Krysiak) discloses an extruder suitable for making food products comprising a core and an encrusting shell. The extruder comprises a closure to prevent the encrusting material flowing into the passageway through which the filling is extruded. The closure is close to the exit from the extruder.

In WO-A-0060959, there is a description of an extruder and a method falling within the scope of the claims of the present application. The subject matter is entitled to priority from the filing date of the PCT application, from which the present application claims priority. The disclosure does not constitute prior art to the claims of the present application therefore.

The three different objectives are basically achieved each by similar means, namely by providing a new method of coextruding a sheet- or ribbon formed flow of extrudable material A with a sheet- or ribbon formed flow of extrudable material B in a zone of joining in a coextrusion die (which term includes an adaptor upstream of the final product forming die) in which B is extruded on A through a port (3) and the two materials proceed together through a passageway (7) towards an exit (8) of the die, wherein the separation wall between said flows, immediately before it ends in port (3) is formed as a flap closure (4) adapted to act as no-return valve for the flow of B onto A, characterised in that the extrusion of B through (3) takes place in pulses.

In the first aspect of the invention the pulsations take place shock-like to distribute B evenly on A over the length of port (3), and the irregularities along the direction of flow produced by the pulsations are evened out, at least in part, during the common flow of components A and B through the end of the coextrusion die—as further dealt with below.

In the second aspect of the invention, the process is adapted to make the flap closure (or closures, if there is coextruded B-material onto both sides of A) act as shutters which stop, at least substantially, the flow of A during each pulse of B-extrusion. This adaption is also dealt with in further detail below. In the third aspect of the invention A is propelled by means of a ram (22) directly upstream of the location where the flows are joined.

In the present specification, a flap or a flap closure refers to a component which is pivoted or feathered along one side and which can move about the pivot, for instance under influence of actuating means or pressure from fluid exerted on the flap. In each of the three aspects of the invention the flap closure is preferably substantially flat and is generally a springy blade, optionally with a thicker or harder section at its downstream end The springy blade can be of steel or other suitable material and can even be made of a rubber material if the temperature of extrusion is sufficiently low to allow this. The optional thicker or harder section at the downstream end serves to stabilize the opening and closing of the flap and may be almost mandatory if a rubber material is chosen to act as the flexible blade (hinge). The pulsation in the flow B is normally best effected upstream of the flap closure by one or more rams or by opening and closing valves. Alternatively, this pulsation can be effected by opening and/or closing the flap closure through mechanical transmission means. The former option is illustrated in FIGS. 1, and 3c, and the latter option in FIG. 4a.

In order to achieve the most regular merging of the components A and B, they should preferably both be planar flows at least in the immediate vicinity of the part where they merge and here be generally parallel to the flap.

The invention can immediately be applied to coextrusion of a flat sheet or ribbon from a flat coextrusion die while the application in a circular die may require that special precautions be taken. In such circular dies the components usually (but not in all cases) flow in a generally axial direction at the location where they are joined and the wall which separates the components before the joining ends in a generally circular cylindrical shape. In connection with the present invention, this would mean that the springy blade would have to form a ring of generally cylindrical shape, and such shape would generally resist bending so much that the B component would be unevenly applied on the A component.

This problem can be solved by making the flap closure ring formed with its surfaces generally perpendicular to the axis of the circular die.

In this connection the two components are preferably, at least in the immediate vicinity of the location where they join, made to flow generally in a radial direction (which may be outwardly or inwardly seen in relation to the axis of the circular die, and following the joining of the flows, the latter may be directed into a generally axial direction and exit generally axially from a final product forming circular exit orifice. However, the present invention can also be used in connection with so-called "peripherical" dies, i.e. dies in which the material is extruded radially out of a circular exit slot, a slot in a cylindrical wall of the die. Such "peripherical" dies are known from the extrusion of food products. In this application the two flows may after merging, proceed generally radially the whole way through to the final product-forming exit orifice.

As a preferred embodiment of the said circular extrusion a method of extrusion through spiral flows can be carried out by means of a circular die having an inlet and a generally circular exit orifice, in which method, for the purpose of equalizing the flow of the material through said orifice around the circumference of the latter, the flow of material between the inlet and exit is divided on a number of part-flows of spiral-form or spiral-like form with an adjusted possibility of overflow between said part-flows, and said part-flows with over-flows gradually join to one common, circular flow. The extrusion die for that method can comprise an extrusion die having an inlet for extrudable material and a generally circular exit orifice spaced at different radial distances from the axis of the die and, between the inlet and outlet, channels for flow extrudable material therethrough, in which a single inlet channel from the inlet branches at least once to form at least two partflow channels, each for a partflow of extrudable material, the partflow channels having a spiral slope, wherein the part-flow channels are arranged generally in a plane or on the surface of a cone, and in which the partflow channels gradually join together.

As mentioned above, the extrusion of B takes place in pulses which should normally be effected upstream of the flap closure (4) and be established by one or more rams or by the opening and closing of valves. These devices should preferably be close to the location where the components are joined. They should normally cooperate with (conventional) preceding pumping or extruding means. If a ram is used, there is preferably used a no-return valve to prevent the ram from pumping the wrong way.

The term "no-return valve" is here meant to comprise, not only a valve which closes by virtue of the back pressure, but also a valve which is acted on by control means to close it at the right time of the process cycle.

In most cases the invention can with advantage by used to apply, not only one B-flow but also two B-flows (B1 and B2) onto the A-flow, B1 on one side and B2 on the other side of A. B1 and B2 may be identical or different in composition.

As mentioned in the introduction the first aspect of the invention concerns a coextrusion aiming to cover material A which during the extrusion has a high apparent viscosity, with thin layers of a material having a much lower apparent viscosity.

The problems in this connection, and the solution by use of the present invention were explained in the introduction. The solution is more precisely stated as follows: the B- or B1- and B2-flows have a lower apparent viscosity than the A-flow and during each pulse the difference between the pressure in the B-flow or flows and the A-flow is sufficient to effect even deposition of B on A over the length of prot (3), the dimensions of the common passageway (7) are adapted to produce a shear sufficient to make the layer thicknesses of B generally even before reaching the exit orifice (8) at the end of passageway (7). More specifically, the cross-sectional area of passageway (7) is reduced towards the downstream end at orifice (8). The need for a substantial pressure difference in each pulse between the B-flow or flows and the A-flow—in other words the need for shock-like pulsations depends on the difference in apparent viscosities. The velocity of each B-flow when it meets the A-flow should preferably in most but not all cases be on generally the same level or higher than that of the A-flow multiplied by the ratio between the apparent viscosity of A and that of B (under the actual conditions). "Shock-like" refers to a pulsation of short duration but high amplitude, i.e. velocity.

In this way it can become economically feasible to use even very expensive copolymers foe the modification surface properties on cheap, tough polymers. Thus, A can consist of high molecular weight polyethylene or high molecular weight polypropylene and B1 and B2 of a polymer or mixture of polymers which adheres to A in the final product and exhibits a melt flow index at least 10 times and preferably at least 20 times as high as that of A; and B1 and B2 together can occupy less than 10% of the thickness of the joined flow.

In such cases, there should preferably be at least 5 pulses per second.

The term "generally even" means that B should cover the surface of A substantially continuously, but furthermore the ration of the thicknesses of B:A should preferably not vary by more than +/−50%, and more preferably by no more than 25% of the average value of B:A.

Furthermore, the B1 and B2 components applied as stated above in the description of the "shear" effect can have an important lubricating effect and thereby reduce the back pressure, e.g. in the combinations of polymers and melt flow indices described above as well as the thickness limit for the B1 and B2 materials specified there.

The second aspect of the invention, which already has been dealt with in the introduction is defined more specifically as follows: in each pulse the pressure of A and B on the closure 4 is sufficient to substantially stop the flow of A so as to achieve a segmental flow of the A and B components referring to the extrusion direction; A and B have generally the same apparent viscosity; and with the solidification of the common flow after extrusion, A and B in the final solid form of the product have different coefficients of elasticity. In this aspect the passageway from the zone of joining to the exit from the coextrusion die should preferably be short in order to maintain a distinct segmental structure.

Figure 5B:
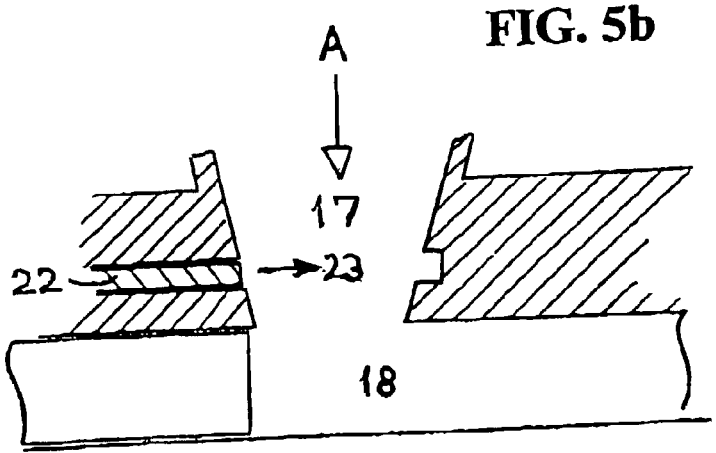
Figure 5A:
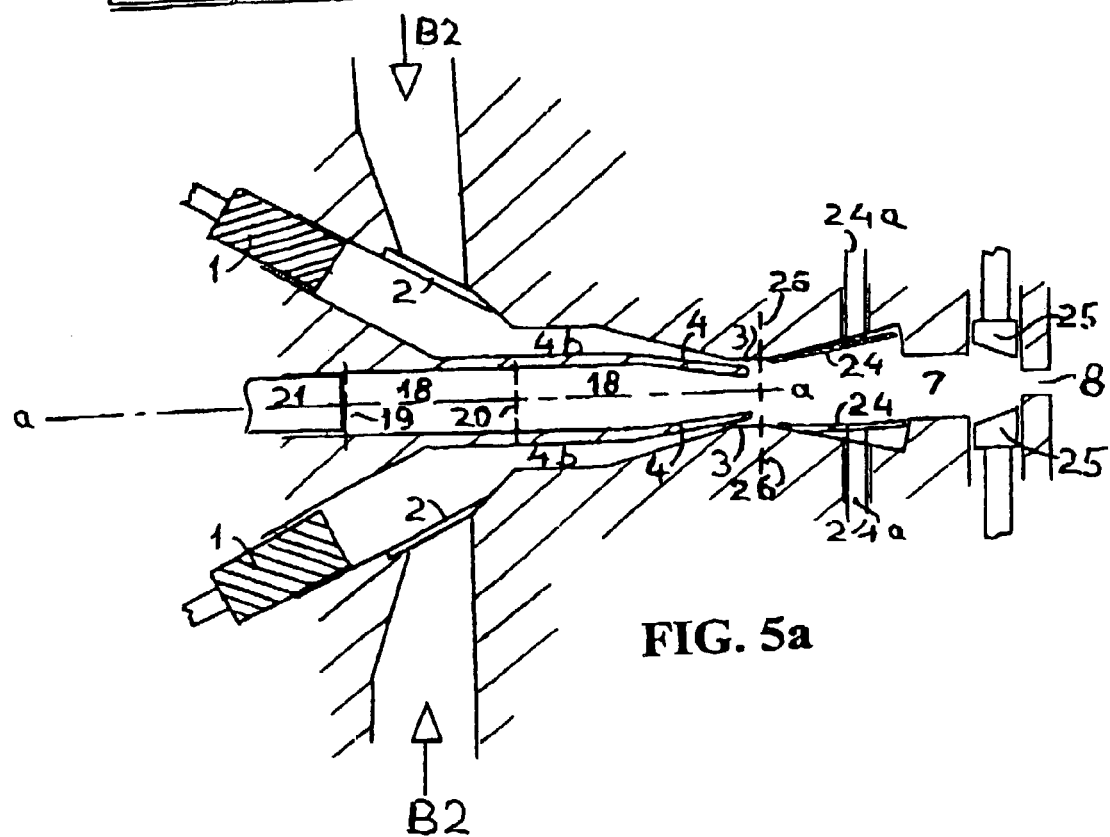

In the third aspect of the invention, the process in which a flow of solid generally dry particles is coextruded with a flow of truly fluid material, the flow of solid particles which is the A-component is propelled by a ram (22) in a conduit (18) which directly leads to the prot or ports (3) through which the truly fluid material, which is the B material, is coextruded as illustrated in FIGS. 5a and b. When B has joined A, the composite flow of A and B is preferably subjected to blending and/or compacting by means of one or more stamps or flaps (24 and 25) which reciprocate in directions transverse of the main direction of the composite flow.

In each of the three aspects of the invention the coextrusion process may further continue so that several B/A or B1/A/B2 flows become joined to a "flat sandwich", a term which indicates that the smallest dimension in the final product is parallel to the smallest dimension of the individual layers, or alternatively the flows may become joined to a "high sandwich", that is the smallest dimension in the final product is generally perpendicular to the smallest dimension of the individual layers. In patent literature (eg the applicant's earlier patents) the latter is referred to as "lamellar extrusion".

In case the present invention is used in a "lamellar extrusion" set up, so that there will be a multitude of exits (8) arranged in a lineary or circular array, the composite flows when leaving these exits may be mechanically divided into segments and interspersed with segments of different material extruded out of other exits in the same linear or circular array to form a cell-like structure, as this is explained in the applicant's copending patent applications, see WO00/60959.

As appears from the foregoing the present invention is not limited to the coextrusion of synthetic polymers, but also in many cases is applicable to coextrusion of food components or the manufacture through coextrusion either of a ceramic product or medical pills. In the last-mentioned two cases component A may either be extruded as a flow of solid generally dry particles propelled by a ram as explained above, or may be extruded as a paste comprising particulate solids.

With respect to coextrusion of food components, it can often with conventional means be very difficult or impossible to "tailor make" their rheologies to the extent which is needed for obtaining a sufficient evenness of layer thickness, and in such cases the present invention is of special importance. Thus, B may be molten chocolate, sugar or caramel, while A is a material of a higher apparent viscosity. Reference may be had in this connection to the example, in which thin layers of molten, relatively fluid chocolate are extruded onto marzipan of plastic consistency.

As an example of the use of the present invention in a coextrusion process forming ceramic products, can be mentioned the manufacture of porous membranes.

The invention shall now be described in further detail with reference to the drawings, of which:

FIG. 1 shows the characteristic part of a flat coextrusion die in operation according to the invention. The drawing represents a section parallel to the machine direction and perpendicular to the main surfaces of the sheet formed or ribbon formed flows A, B1 and B2.

Figure 2B:
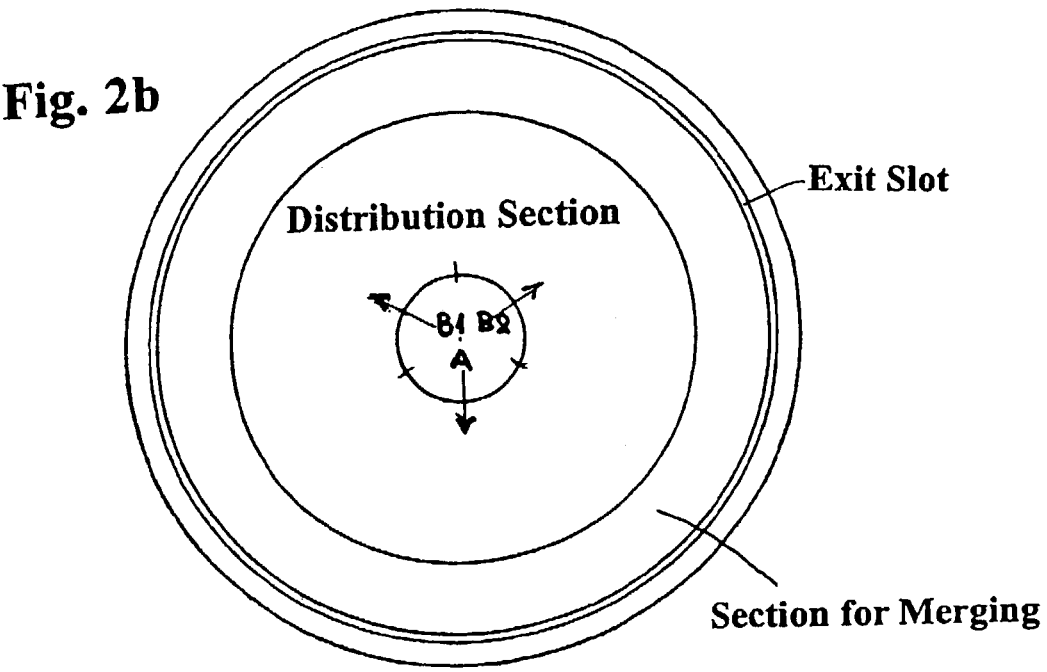
Figure 2A:
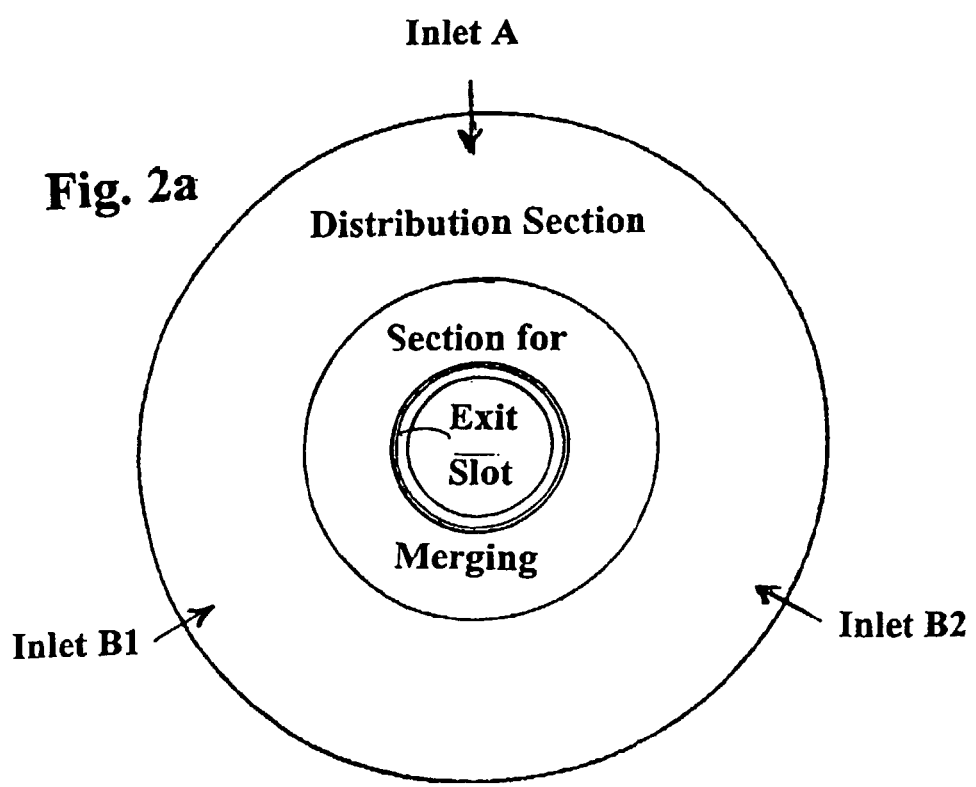

FIGS. 2a and b are diagrammatical flow-sheet like sketches of circular dies for the coextruding of tubes according to the invention. In 2a the flows move generally from the outside towards the inside, and in FIG. 2b generally the opposite way.

Figure 3A:
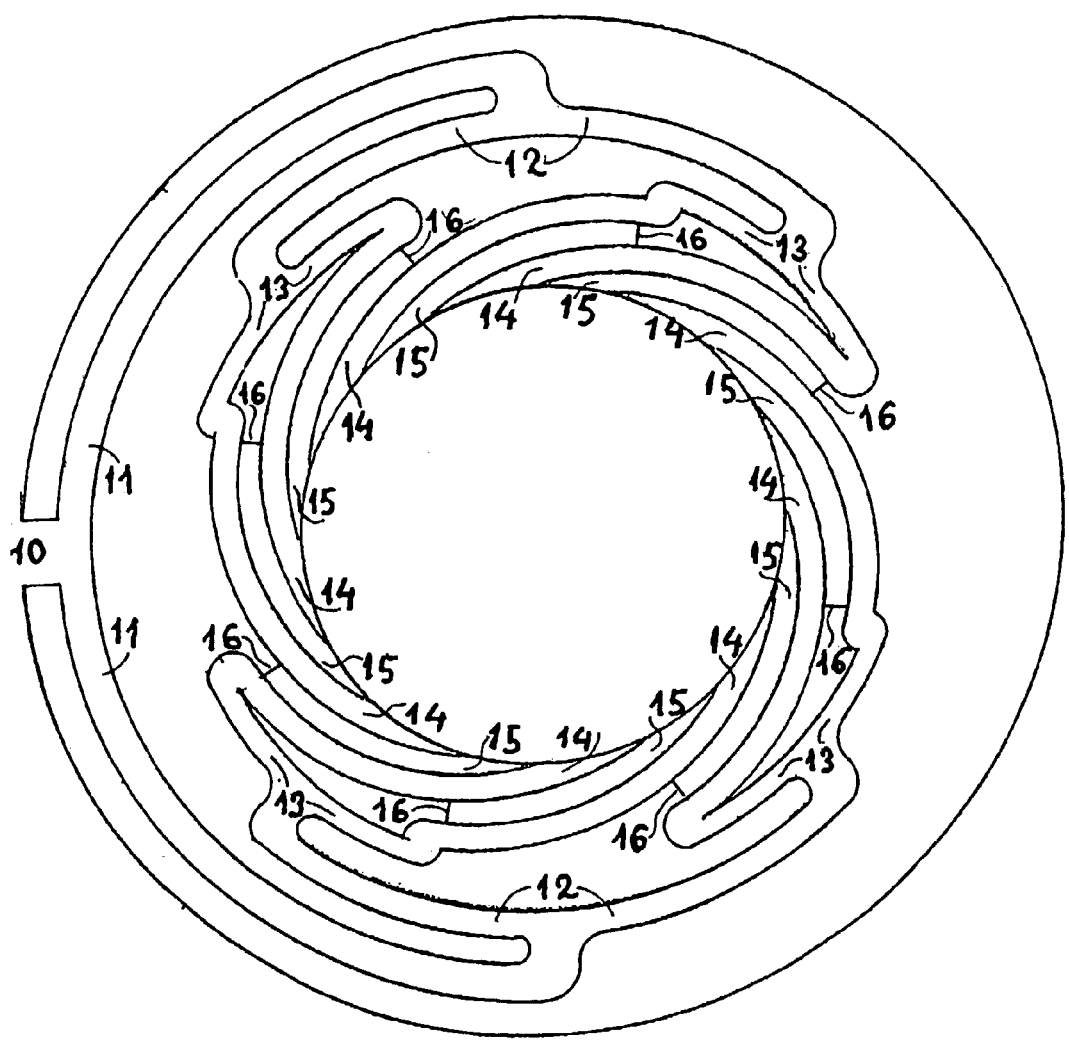

FIGS. 3a and b show suitable constructions of the distribution sections of FIGS. 2a and b, respectively. They are views through the distribution channels for component A.

FIG. 3c which is a modification of FIG. 1 shows the section for merging (including rams and exit) in the die according to the sketch FIG. 2a. The drawing shows a section through the axis (9) of the circular die, but the distribution part of the die is omitted. The drawing also represents the section for merging in the die according to FIG. 2b but then the axis (9) must be considered laying outside the sheet and under the drawing.

Figure 3B:
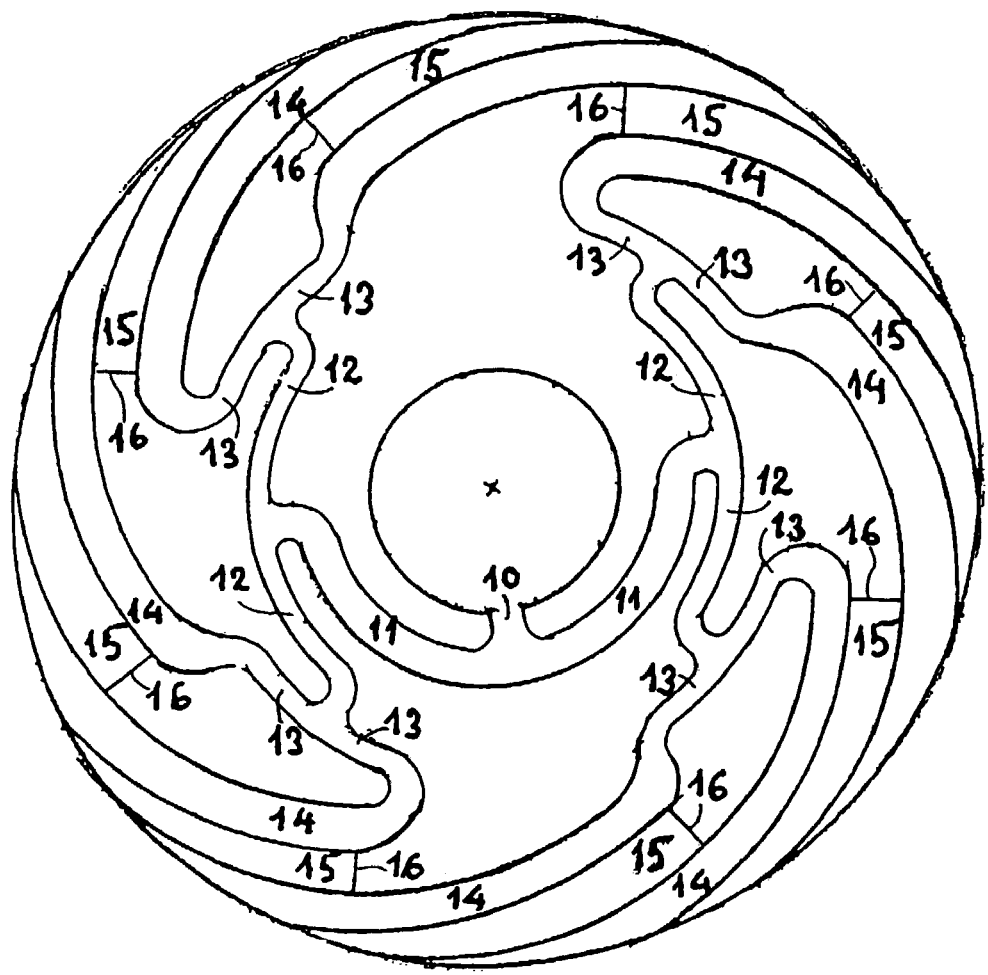
Figure 3C:
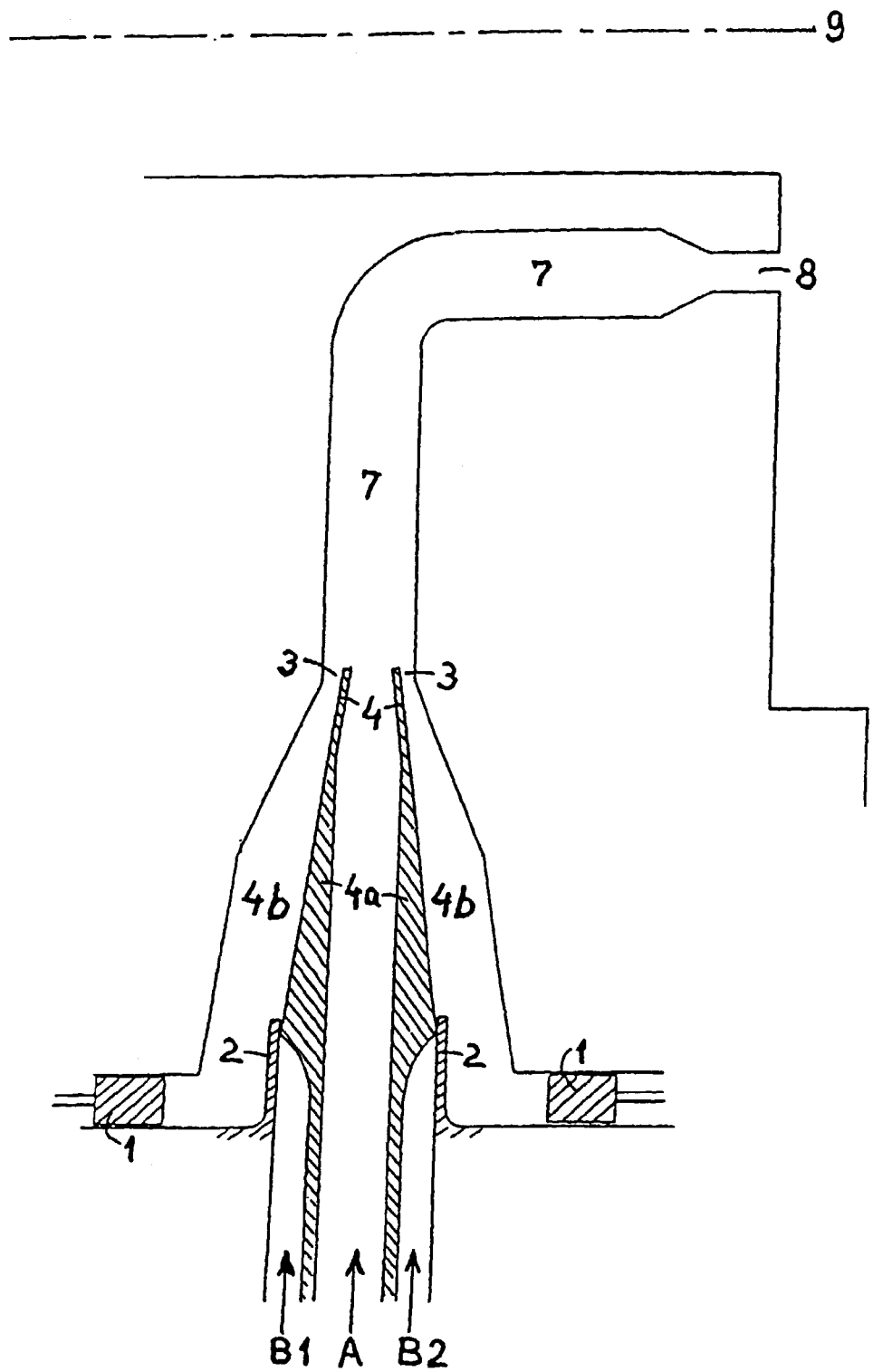
Figure 4A:
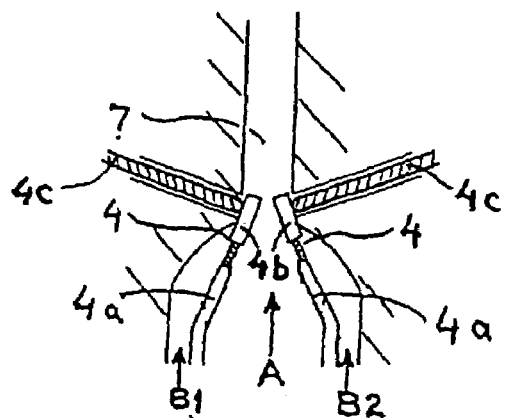

FIGS. 4a, b, c and d show different modifications of the section for merging of the components, these modifications relating to the flat die arrangement according to FIG. 1 and/or the circular arrangement according to FIG. 3.

FIGS. 5a and b show a modification of the die in FIG. 1, adapted to perform with generally dry, particular A-component and propelling this by use of a ram. FIG. 5a is a section corresponding to that of FIG. 1 while FIG. 5b, which only represents the vicinity of this ram, shows section a—a of FIG. 5a.

In FIG. 1, the three components A, B1 and B2 are fed into this characteristic part of the coextrusion die as shown by the three arrows. This feeding is established by primary, conventional feeding means (extruders or pumps), which are not shown in the drawing. Between these extruders or pumps and the apparatus shown there may be conventional distribution means to ensure that the components become evenly distributed over the width. Normally A flows in steady manner (but may in some cases be extruded in pulses) while B1 and B2 are extruded in pulses established by rams (1), which superpose the flows produced by the primary feeding means. The no-return valves (2) which ensure that the rams work the right way can e.g. be made of springy blades.

At the ports (3) where B1 and B2 enter the chamber for A, there are two springy blades (4), which are extensions of or connected with the wall (4a) of the chamber for A. The blades (4) are installed as no-return valves. When under a sufficient pressure from B1 and/or B2 they may even act as shutters for A, so that after joining of the flows, segments of A will alternate with segments of B1+B2 (the two may be of identical composition). However, this does not take place in the embodiment of the invention shown in the drawing. Here B1, and B2 are joined with A as "lumps" (5) on each of its surfaces. Since the flows A, B1 and B2 are sheet-formed or ribbon formed and the shape of blade (4) is adapted to this, these "lumps" will be transverse "filaments" with their major direction perpendicular to the view plane. The drawing shows the situation at the end of the pulse, when the blades (4) are just about to close the ports (3). Rams (1) are still pressing and the no-return valves (2) therefore are closed. The previously coextruded "lump" is shown as (6). In this application of the invention, the apparent viscosities of B1 and B2 are essentially lower than that of A, which will have the effect that the "lumps" gradually will be smeared or sheared out to practically even layers while the B1-A-B2 flow moves through the common passageway (7) towards the exit (8) of the coextrusion die.

Therefore, (6) is shown smaller than (5) and there is not shown any "lump" further downstream.

Each of the rams (1) can extend over the full width of the generally sheet formed or ribbon formed flows B1 and B2, or there may preferably be a row of rams for B1 and one for B2 (depending on the mechanical construction). However it must hereby be ensured that there is established an even pressure from side to side in each of the flows when they meet the port (3). This is a matter of the dimensions of the chambers for B1 and B2, the distance between the rams, and the pressures of B1 and B2 during the process.

In case the rams (1) extend over the full width of flow A, the inlet channels (4b) for B1 and B2 upstream of the valves (2) should also extend so, but if there is arranged rows of rams, each ram should preferably be fed from a separate channel. Along the length of the flap closure (4), the distance from this flap to the opposite wall of channel 4b may need to be very short relative to the length of flap (4) since otherwise this flap may be bent excessively towards the opposite wall when the pressure of B1 or B2 is at minimum and the pressure in A is high.

In some cases, especially in connection with the second aspect of the invention, in which the frequency of the pulsations is generally not as high as in the first and third aspect, it is possible to use only one pulsating, narrow ram (1) for each of the B components, to serve the entire width of the coextrusion, even when this width is sizeable, provided there is arranged for an efficient distribution between this ram and the port (3) where the components merge.

The flow-sheet like sketches 2a and b indicate the successive sections in suitable dies for circular coextrusion according to the invention while the drawings FIGS. 3a and b as already mentioned illustrate the preferred corresponding distribution system for component A. This starts with a branching-out system, which first has been described in U.S. Pat. No. 2,820,249 in which patent it is used in connection with coating of items by coextrusion.

Component A is fed into this system through part (10), then branches out to two partflows in channels (11), continues as 4 partflows in channel (12) and 8 partflows in channels (13). (Depending on the dimensions of the die there can of course be formed a bigger or smaller number of partflows but in any case a power of 2.) The part-flows in (13) continue in a "spiral" distribution system, through grooves (14) whereby a proper balance is established by rheological calculations between the flows through the spiral grooves (14) and an over-flow between the latter, which takes place in narrow gaps in the spaces (15) the beginning of which are shown by the lines (16).

A similar branching-out system can conveniently be used for components B1 and B2, however when there is used a circular array of rams, as shown, and the latter are sufficiently close together, there is no need for spiral distribution of these components, since each of the part-flows which result from the dividing out, then more practically can go directly to a ram. Furthermore, if the viscosities of B1 and B2 are much lower than that of A, a lower degree of branching of these two components will be sufficient In practice, the distribution systems for A, which are shown in FIGS. 3a and b, may be carried out in a die or die-section consisting of two discs, which are screwed together. The channels (grooves) may be formed in one of these discs only, or preferably a part of each channel is formed in one and another part in the other disc, with these channel parts fitting together.

However, as mentioned in connection with FIG. 1, one ram for each B-component can under circumstances be sufficient, but then an efficient distribution between this ram and port (3) is needed.

As mentioned FIG. 3, which shows in detail FIG. 2a's "section for merging", is a modification of FIG. 1. The reference numbers have the same significance. It should be noted that the springy blades (4) are plane like in FIG. 1, but now of course in the form of flat disc-formed rings.

Similarly, if the chambers for B1 and B2 immediately upstream of the no-return valves (2) are circular chambers around the entire die, as they can be, then the two valves (2) are also formed as flat, disc-formed rings and can be set-up in a system as here shown, however as it appears from the foregoing it is usually more practical to let each of the part-flows which result from the dividing-out go directly to a ram through a separate conduit, and in that case an arrangement as that shown in FIG. 1 is also applicable.

As shown in the drawing, the circular die should normally be adapted to extrude the composite flow B1/A/B2 out in a generally axial direction when leaving the exit (B).

The rams (1) can be operated by direct mechanical, by hydraulic, pneumatic or electromagnetic means. Hydraulic operation will normally be most convenient. In the inwardly extruding system (FIG. 2a) the rams are easily accessible from the outside of the die, but in the outwardly extruding system (FIG. 2b) one array of rams must be operated through the open bore in the middle of the die. This open bore can also be used for other conduits or connections, e.g. a conduit for internal cooling of the extruded tube. Obviously the die set-up in which the flows move inwardly (FIG. 2a) is best suited for manufacture of tubular sheeting or pipes of a relatively small diameter down to 10 mm or less, while the other set-up (FIG. 2b) is best when a relatively large diameter of the product is wanted for instance up to 5 m or more.

When producing pipes in which stiff segments alternate with soft segments, the set-up shown in FIG. 2a should be used.

Figure 4B:
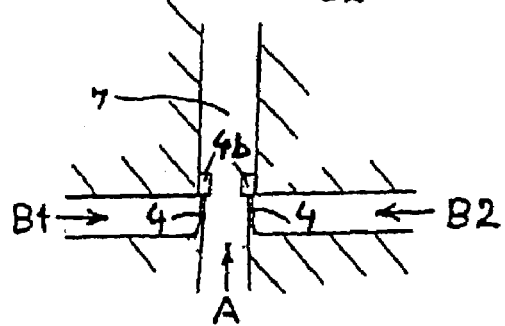

The modifications shown in FIGS. 4b, c and d can be seen as modifications of the flat die shown in FIG. 1 and also as modifications of the circular die shown in FIG. 3. The modification shown in FIG. 4a relates only to flat dies (to FIG. 1) since a flap closure becomes conical if it is considered circular, and of course in that form it cannot work.

The significant reduction of thickness of flow which appears from FIG. 4a can be advantageous if there is a particular need to reduce the back pressure in component A and still under use of the lubricating effect of B1 and B2, end with a relatively thin sheet.

Figure 4C:
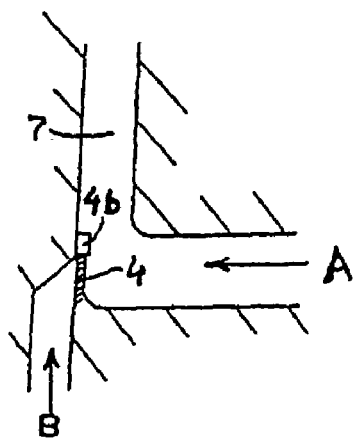
Figure 4D:
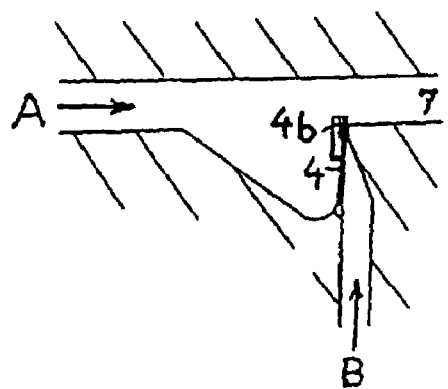

FIG. 4a also illustrates the feature that the opening and/or closing of the flap closure (4) can be effected through mechanical transmission means (4c) instead of by induced pressure variations in component B (or B1 and B2), and furthermore FIG. 4a, as well as FIGS. 4b–d, show the flap closure (4) as a flexible blade ending in a thicker or harder portion (4b) for the purpose of reinforcement and stabilization. In fact this portion (4b) can be the main part of the flap (4) while the shorter flexible part acts as a hinge.

Going back to the mechanical transmission means (17) in FIG. 4a, they are here shown as rods which push on the thicker or harder part (18) of the flap closure. When a substantial pressure difference between component B (or B1 and B2) and component A is required (see claim 11) then obviously the, flap closure (4) must be adapted to withstand this pressure difference and keep the port closed when not mechanically activated. Alternatively, (17) can be hinged on (18) and may act by pulling or push-pulling.

The different arrangements of the channels shown in FIGS. 4b, c and d may be chosen in cases when there may be constructional problems in arranging the flows of the A and B components generally parallel with each other prior to the merging. However, the abrupt bending of flows shown in these sketches may under inappropriate circumstances cause a harmful stagnation.

In FIGS. 5a and b a generally dry particulate product (A) which e.g. may be a raw material for ceramics, plastics e.g. PTFE composites, foodstuff or medical pills, is fed by gravity from a hopper through feeding chamber (17) into the A-extrusion channel (18). The hopper is preferably evacuated, since air can cause problems in the coextrusion, blending and compacting processes.

In FIG. 5a the upstream and downstream boundaries of the feeding location is shown by the dash lines 19 and 20. The feeding of A by gravity may be assisted by a vibrator or by other agitation means (not shown). A is propelled through the channel (18) by means of a ram (21). In the most backward position of this ram, its front generally coincides with the backward boundary of the feeding location (dash line 19). Before moving ram (21) forward to propel A, the connection between the hopper and channel (18) is closed by a gliding-closure (22) as indicated by arrow (23).

Fluid components B1 and B2 (which normally are identical) are coextruded in pulsations by means of the two rams (1) through the B1 and B2 extrusion channels (4b) to port (3) comprising the no-return valve (4), which is a flap closure, all as explained in connection with FIG. 1.

The movements of the three rams, one (21) for A and two (1) for B1 and B2, may be simple reciprocations, but especially for B1 and B2 it will usually be advantageous to work in series of forward strokes followed by a continuous retraction to the starting position. Ram (21) is preferably lubricated either with B1/B2 component or with a fluid which for purposes which depend on the intended use of the final product can be considered as compatible with B1 and B2. This lubricant can be injected from behind the ram or otherwise in well-known manner. Means for this are not shown.

The lubricant should preferably be pumped into the coextrusion system in amounts which are sufficient not only for lubricating ram (21) but also for lubricating the propelled flow of A during its passage towards port (3).

The fluid B1 and B2 components, which are coextruded on the two surfaces of the dry, particulate flow, may be able to penetrate to the middle of flow A without any use of mechanical blending means, but usually such means are needed if a reasonably homogenous blending of A, B1 and B2 is wanted. In the drawing these means are the flaps (24), which vibrate fast in mutually synchronized manner and thereby subject the composite flow to a shear which is transverse to the main flow direction. Transmission rods (24a) for these vibrations are shown.

The combined coextrusion and blending according to this aspect of the invention is in particular advantageous if the proportion between the fluid components (B1 and B2) and the generally dry, particulate component (A) is relatively low so that blended product on the whole still appears particulate (as distinguished from a paste). When the composite flow has this character, there may be a need to compact the material before the exit from the extrusion die. If only a slight compression is needed a narrowing of conduit (7) may be sufficient, but the tendency of such particulate products to block a narrowing passageway is very high, and increased pressure on ram (21) may not overcome such blocking. This problem is solved by carrying out the compression transversely by means of fast vibrating stamps (25), which are oppositely synchronized, so that they alternately move towards and away from each other. These stamps cover the full width of the composite flow, and the front of at least one of them is biased in relation to the main direction of the flow so that they gradually reduce the gap of the conduit. In the position where the stamps are closest together they should preferably be slightly closer together than the gap of exit 8.

Instead of two stamps (25) there may be one only.

In this drawing the blending means (24) are shown as flaps but can alternatively be stamps, (i.e. comprising a component which mixes in a generally rectilinear direction), and the means for compression are shown as stamps but can alternatively be flaps.

In FIG. 5a the surfaces of flaps (24) and the fronts of stamps (25) are with some approximation generally parallel with the surfaces of the surfaces of the coextruded B1 and B2 layers. However this third aspect of the invention can also be carried out in a way which will appear if the apparatus part downstream of the dash line 26 is understood as turned 90° around an axis parallel with the main direction of flow. In this way it will be possible to make a composite extrusion device with several exits (8) close together in array as required for the "lamellar coextrusion" which has been mentioned above. The "lamellar extrusion" using this embodiment of the invention can e.g. be used as an improved method to make medical pills which release the active substances in the body in several steps at predetermined time intervals, a function of pills which in itself is well-known.

EXAMPLE

This example demonstrates the use of the invention for manufacture of a novel confectionery product, which can be expected to have good sales appeal, namely corrugated (waved) chips of marzipan covered on both sides with thin layers of dark chocolate. In the principle this could be done by ordinary coextrusion, when the chocolate is in semi-molten, high viscosity state with an apparent viscosity reasonably close to the apparent viscosity of the plastic marzipan mass. However, the melting range of the dark chocolate is very narrow and the chocolate has high tendency to become supercooled and therefore remaining truly fluid instead of becoming part-solidified, when it gradually cools down from the molten state. This means that it is very difficult to "tailormake" the rheology of the dark chocolate for such a coextrusion. Therefore the present invention is used, and the chocolate is maintained truly molten and fluid while it is coextruded with the plastic marzipan mass.

The process is carried out in a pilot-coextrusion line in which the die is constructed essentially as shown in FIG. 1, however the exit of the die, beginning where the conduit (7) begins to narrow down, is gradually changed into the corrugated shape, that is the sides of the slot are parallel and have the shape of a wave, with the angle at the midpoints being about 30° to the wave direction. The gap of exit (8) is 2.5 mm, and the width of this and of the corresponding channels in the die is 30 mm. The depth of channel (7) before the narrowing is 4.0 mm, depth of channel for A (marzipan) before the merging is 3.0 mm. The depth of the two channels for component B (chocolate) is 2.0 mm at the beginning, but changes to 1.0 mm along the blades (4). This low depth is chosen in order to secure that the blades (4) do not bend in an irregular manner under the pressure from component A. The length of the blades (4) is 16 mm and thickness of the latter is 0.20 mm over the first 5 mm and 0.40 mm over the rest. The length of channel (7) before the narrowing is 100 mm.

A (marzipan) is constantly fed by means of a conventional ram extruder, hydraulically driven, and B (molten chocolate) is also primarily fed by means of a conventional ram extruder (not shown), but in this case pneumatically driven. The reason for driving the A-ram hydraulically is the relatively high pressure required, while the reason for driving the B-ram pneumatically, partly is the lower pressure needed, and partly the need to obtain a certain "buffer" effect, so that the pressure in B upstream of the non-return valves (2) does not raise excessively when these valves are closed.

Due to the very low width of the die in this pilot line, there is not used distribution means between these primary rams and the dieparts shown in FIG. 1.

Each of the (secondary) rams (1) immediately upstream of the merging zone cover the full width of the flows. Their pistons are of a rectangular section with cross-sectional dimensions 29.95 mm×1.95 mm. Their movements are directly mechanically driven with adjustable strokes. They perform a series of 10 strokes forward followed by return to the starting position.

The temperature of B is kept at 40° C. and the temperature of A at 15° C. until these components enter the die. The reason for using this relatively low temperature is to assist in the cooling of B.

The temperature of the die is maintained at 32° C., under conditions of equilibrium the chocolate will be part molten at this temperature, but under the actual conditions of this extrusion it becomes supercooled and remains truly fluid, except where it immediately contacts the cold marzipan.

The pressure in the A-ram is adjusted to produce a throughput of 15 g/s. Under actual conditions this corresponds to about 50 bar ($5\times10^6$ Pa). The primary B-ram is extruding under a pressure of about 10 bar ($1\times10^6$ Pa).

The secondary rams for B (1) work in strokes of about 0.05 sec duration with a period (stroke+interruption) of 0.1 sec corresponding to 10 strokes per second. The amplitude of the strokes is adjusted to make a 0.4 mm coating of chocolate on each side of the marzipan.

The corrugated "tape" of marzipan covered with chocolate is relatively stiff when it leaves the exit (8) of the die. It travels 2 mm unsupported and is then conveyed by a belt. Cold air is blown for cooling. While on the conveyor belt the "tape" is cut to short lengths.

What is claimed is:

1. In a method of coextruding by means of a coextrusion die which comprises the steps of feeding under extrusion pressure a flow of an extrudable material A and at least one flow of an extrudable material B through separate passageways in said die which are separated by a separation wall, and at the end of said wall, delivering flow B through a laterally elongated delivery port to join with flow A to give a combined flow, and passing the combined flow through a common passageway and eventually out of said die in sheet- or ribbon-form, the improvement wherein the delivery of flow B through said port takes place in pulsating fashion with the flow pulses after emergence from said port being prevented from reentry into said port.

2. The method of claim 1 wherein reentry of said pulses is prevented by forming the end of said separation wall as a flap closure functioning as a no-return valve for said port.

3. The method of claim 2 wherein said separation wall end comprises a springy blade and is adapted to flex between positions closing and opening said port.

4. The method of claim 2 wherein the pulsating passage of said flow B through said port is achieved by periodically positively actuating said flap closure to alternately block and open said port to passage of said flow B.

5. The method of claim 1 wherein said flow B is advanced by feed means through the passageway therefor under normal extrusion feed pressure and the pulsating delivery of said flow B is achieved by intermittently applying excess pressure on said flow B upstream of said port.

6. The method of claim 1 wherein the pulsating passage of said flow B is achieved by alternatively opening and closing said passageway for the flow B upstream of said port.

7. The method of claim 2 wherein at least at the immediate vicinity of where said flows A and B join at said port, at least one of said flows is a planar flow which is generally parallel to said flap closure.

8. The method of claim 7 wherein said coextrusion die is a flat die extruding a flat sheet or ribbon and at least in said immediate vicinity, at least one of flows A and B is a planar flow generally parallel to the plane of said sheet or ribbon.

9. The method of claim 7 wherein said coextrusion die is a circular die and the end of said separation wall forming said flap closure has the shape of a generally flat ring having its surfaces directed generally perpendicularly to the axis of said die.

10. The method of claim 9, wherein said separate passageway for at least one of said flows A and B at least in the immediate vicinity of said port extends in a generally radial direction with respect to said die axis with the separation wall end situated in said generally perpendicular direction to said die axis; and downstream of said port, said common passageway extends in a generally axial direction to exit generally axially from said die through an annular exit orifice.

11. The method of claim 9 in which the passageway for at least said material A terminates at the separation wall end in an annular delivery opening for material A in communication with said common passageway and wherein in order to equalize the passage of said material A around the circumference of said annular delivery opening, the flow of material A upstream thereof is subdivided into a plurality of sub-flows extending in generally spiral paths, said sub-flows merging together gradually into an annularly continuous flow for passage to said delivery opening.

12. The method of claim 1 wherein a first flow B1 is on one side of flow A and a second flow B2 is on an opposite side of flow A, each with its own delivery port, and said flows B1 and B2 join to opposite sides of flow A upon their emergence from the respective delivery ports and pass with flow A to said common passageway.

13. The method of claim 1 wherein said flow B has an apparent viscosity lower than that of flow A and said flow B is fed through its passageway under an extrusion pressure sufficiently different form the extrusion pressure of flow A as to effect substantially even application of flow B to flow A over the transverse length of said delivery slot; and the dimensions of said common passageway for the combined flows A and B are such that in advancing through said common passageway the flows in contact with passageway surfaces are subjected to shear to further even the distribution of flow B prior to exiting of the common flow from said die.

14. The method of claim 13 wherein the cross-sectional area of said common passageway is reduced toward its exit end.

15. The method of claim 13 wherein a first flow B1 is on one side of flow A and a second flow B2 is on an opposite side of flow A, each with its own delivery port, and said flows B1 and B2 join to opposite sides of flow A upon their emergence from the respective delivery ports and extrudable material A consists essentially of high molecular weight polyethylene or high molecular weight polypropylene and extrudable materials B1 and B2 are at least one polymer material which adheres to material A after the combined flow exits from said coextrusion die and exhibits a melt flow index at least 10 times greater than that of material A.

16. The method of claim 15 wherein in the combined flow, materials B1 and B2 are arranged in layers on opposite surfaces of flow A, and the total layer thicknesses of flows B1 and B2 constitute less than 10% of the overall thickness of the combined flow.

17. The method of claim 1 wherein during each flow pulse of flow B, the passage of flow A within its passageway is interrupted.

18. The method of claim 17 wherein said flap closure is adapted to move under pressure to a position blocking the passageway for flow A and interruption of said passage of flow A is achieved by adjusting the relative extrusion pressures of flows A and B such that said flap closure is moved to said flow A blocking position, whereby the combined flow is formed of alternating segments of material A and material B.

19. The method of claim 18 wherein said materials A and B have substantially the same apparent viscosity.

20. The method of claim 19 in which said materials A and B are selected so as to solidify after exiting from said coextrusion die and in the final solid form to exhibit different coefficients of elasticity.

21. The method of claim 1 wherein material A consists essentially of solid generally dry particles and material B consists essentially of a normally fluid material.

22. The method of claim 21 wherein in order to blend or compact the materials in said combined flow, said combined flow while moving in said common passageway is subjected to a reciprocating mechanical force applied in a direction transverse to that of said combined flow.

23. The method of claim 1 wherein both of said materials A and B are edible materials suitable for yielding human food.

24. The method of claim 1 wherein at least said material A comprises a particulate solid adapted to serve as a component of medical pills.

25. An extruder comprising a coextrusion die for coextruding a sheet- or ribbon-formed flow of an extrudable material A with at least one sheet or ribbon-formed flow of an extrudable material B said coextrusion die comprising separate passageways for the flows of A and B, said passageways being separated by a separation wall, extrusion feed means for advancing the flows A and B through their respective passageways, the passageway for flow B at the end of said wall terminating in an delivery port which is elongated in a direction transversely of the direction of flow therethrough, downstream of said delivery port a passageway common for both flows A & B wherein flow B after passage through said port joins to flow A to give a combined flow, said common passageway terminating in an exit through which the combined flows emerge from said die, pulsating flow control means for causing the advance of said flow B through said delivery port to take place in pulsating fashion, and reverse flow blocking means effective after the delivery of each flow A pulse through said delivery port to prevent reentry of such pulse into said port.

26. The extruder of claim 25 which comprises flap closure means at the end of said separation wall movable to and from a port blocking position to act as said flow control means.

27. The extruder of claim 26 wherein said separation wall is generally planar and includes an end section adjacent said port which is movable out of the plane of said wall to a position blocking said delivery port to function as said flap closure means.

28. The extruder of claim 26 wherein said flap closure means comprises a springy section which is adapted to flex and thereby permit said movement of said closure means to and from said port blocking position.

29. The extruder of claim 26 wherein said coextrusion die is a circular die and the end of said separation wall forming said flap closure means is in the shape of a flat ring having its surfaces directed generally perpendicularly to the axis of said die.

30. The extruder of claim 29 wherein said separate passageway for at least one of said flows A and B at least in the immediate vicinity of said separation wall end extends in a generally radial direction with respect to said die axis and the separation wall end extends therebetween in said generally radial direction to said die axis; and downstream of said separation wall end, the combined flows advance in said common passageway in a generally axial direction to exit as a tube generally axially from said die through a circular exit orifice.

31. The extruder of claim 25 which comprises two passageways for flow B1 and flow B2 disposed on opposite sides of the passageway for flow A, each being separated from the flow A passageway by its own separating wall, each of such flow B1 and B2 passageways terminating at the end of the separating wall therefor in a delivery port for the respective flow which port is elongated transversely of the flow direction, and at the ends of said walls a common passageway connecting with said flow A passageway and with the delivery ports for receiving the flows B1, B2 and A into a common stream with the flows B1 and B2 forming layers of opposite sides of said flow A.

32. The extruder of claim 31 wherein the dimensions of said common passageway are selected such that as the common stream moves therethrough, the surfaces of said layers of B1 and B2 in contact with wall of said common passageway are subjected to shear sufficient to substantially even the thicknesses of said layers.

33. The extruder of claim 32 wherein the cross-sectional area of said common passageway is reduced towards its downstream end.

34. The extruder of claim 29 wherein said passageways for said flows A and B in said circular die each includes an annular portion upstream of said separation wall end, and further comprising circumferential flow equalization means for delivering at least one of said flows to the corresponding annular passageway portion, said means comprising a plurality of sub-channels for sub-flows of the flow material, which sub-channels extend in generally spiral paths relative to the die axis and gradually merge together into a continuous annulus connecting with said annular passageway portion, said sub-channels including space for overflow of said sub-flows.

35. The extruder of claim 34 wherein said equalization means is for flow A.

36. The extruder of claim 34 wherein said equalization means has at least one inlet opening for receiving said flow and passing the same to said sub-channels, each said inlet opening and said continuous annulus being spaced different distances in a radial direction from said die axis, and said sub-channels are arranged generally on the surface of a cone defined between such inlet openings and said continuous annulus.

37. The extruder of claim 34 wherein all such inlet openings divide into branches connecting with beginning ends of the spiral sub-channels to distribute the flow to the latter.

38. The extruder of claim 34 wherein said spiral sub-channels lie generally in a plane arranged perpendicularly of the die axis.

39. The extruder of claim 25 wherein said pulsating flow control means comprises at least one ram periodically acting on said flow B upstream of said delivery port to create pulses in said flow and one-way valve means cooperating with said ram to permit said flow B to advance only in the direction of said port.

40. The extruder of claim 25 wherein said pulsating flow control means comprises mechanical actuating means connected to said flap closure to move the same alternatively to and from its blocking position.

41. The extruder of claim 25 wherein at least in the immediate vicinity of said delivery port, said passageways for both flows A and B are generally planar and said flap closure means is generally linear and in its open position is generally parallel to said passageways.

42. The extruder of claim 25 wherein said coextrusion die is a flat die extruding a flat sheet or ribbon and at least in the immediate vicinity of said delivery port, the passageways for both flows A and B are laterally extended slots generally parallel to the plane of said sheet or ribbon.

43. The extruder of claim 25 which further comprises at least one compression means acting on the combined flow in said common passageway, said compression means moving in reciprocating fashion transversely of the flow direction in order to blend or compact the materials in said combined flow.

44. A circular coextrusion die for coextruding a sheet- or ribbon-formed flow of an extrudable material A with at least one sheet or ribbon-formed flow of an extrudable material B, said coextrusion die comprising separate annular passageways for the flows of A and B, a separation wall separating said passageways, the passageway for flow B at the end of said wall terminating in an annular delivery port into the A-flow passageway, and communicating with said A-flow annular passageway downstream of said delivery port an annular passageway common to both flows A & B wherein flow B after passage through said port joins to flow A to give a combined flow in said common passageway, said common passageway terminating in an annular exit opening through which the combined flow emerges from said die in tubular form, said separation wall having adjacent said delivery port at least an end portion thereof of generally planar form extending perpendicularly to the die axis, the planar end portion being adapted to flex from and to its plane to act as a flap closure for said delivery port and thereby to adjust its flexed position in response to a difference in flow pressure in the flows acting on its opposite sides.

45. The die of claim 44 wherein at least the end portion of said separation wall is formed as a generally flat disc-like ring extending perpendicularly to the axis of said die.

46. The die of claim 44 wherein said annular passageways for flows A and B are at least in the vicinity of said delivery port directed generally radially of the die axis and parallel to said planar end portion of said separation wall and said common passageway is directed generally axially and communicates with an axially opening exit orifice.

47. The die of claim 44 wherein said flat disc-like ring is a springy blade.

48. The die of claim 44 comprising separate annular flow passageways for extrudable materials B1 and B2 each of which is separated from the passageway for flow A by a said separation wall and terminates in a delivery port at the end of its separation wall for joining the B1- and B2-flows to flow A, the delivery ports for flows B1 and B2 being situated on opposite sides of flow A so that flows B1 and B2 join flow A on its opposite sides to form said common flow into the common downstream annular passageway, each of said separation walls having adjacent the corresponding delivery port said generally planar end portion adapted to flex from its plane to act as a said flap closure for said delivery port.

49. The extruder of claim 44 wherein at least one of said annular passageways for said flows A and B has spaced upstream thereof at least one inlet opening in communication therewith, such inlet openings and the corresponding annular passageway being spaced different radial distances from the axis of the die; and further comprising circumferential flow equalization means between such inlet openings and the corresponding annular passageway, said means comprising a plurality of sub-channels for sub-flows of the flow material, which sub-channels extend in generally spiral paths relative to the die axis and gradually merge together into a continuous annulus connecting with said annular passageway portion, said sub-channels including space for overflow of said sub-flows.

50. The die of claim 49 wherein the radial distance of said annular passageway from said die axis is greater than the radial distance of such inlet openings from said axis so that the spiral sub-channels spiral radially outwardly toward said annular passageway.

51. The die of claim 49 wherein the radial distance of said annular passageway from said die axis is less than the radial distance of such inlet openings from said axis so that the spiral sub-channels spiral radially inwardly toward said annular passageway.

52. The die of claim 49 wherein all such inlet openings divide into branches connecting with beginning ends of the spiral sub-channels to distribute the flow to the latter.

\* \* \* \* \*